United States Patent
Fan et al.

(10) Patent No.: US 10,360,004 B2
(45) Date of Patent: Jul. 23, 2019

(54) USING DYNAMIC INFORMATION TO REFINE CONTROL FLOW GRAPHS

(71) Applicant: International Business Machines Corporation, Armonk, NY (US)

(72) Inventors: Si Bin Fan, Beijing (CN); Bo Li, Beijing (CN); Nai Jie Li, Beijing (CN); Jia Sen Wu, Jiangsu (CN); Zi Ying Xin, Beijing (CN); Xiao Zhen Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/443,038

(22) Filed: Feb. 27, 2017

(65) Prior Publication Data
US 2018/0246706 A1 Aug. 30, 2018

(51) Int. Cl.
*G06F 9/44* (2018.01)
*G06F 8/41* (2018.01)
*G06F 8/75* (2018.01)

(52) U.S. Cl.
CPC .............. *G06F 8/433* (2013.01); *G06F 8/443* (2013.01); *G06F 8/75* (2013.01)

(58) Field of Classification Search
CPC . G06F 8/443; G06F 8/433; G06F 8/30; G06F 8/427; G06F 8/441
USPC .................................................. 717/144, 157
See application file for complete search history.

(56) References Cited

U.S. PATENT DOCUMENTS

| 7,912,964 B2 | 3/2011 | Sabatelli et al. |
| 2008/0196012 A1 | 8/2008 | Cohen et al. |
| 2012/0324454 A1 | 12/2012 | Gounares et al. |
| 2013/0091495 A1* | 4/2013 | Garg .................. G06F 11/3684 717/131 |
| 2014/0090067 A1 | 3/2014 | Tripp |
| 2015/0212928 A1 | 7/2015 | Gounares |

FOREIGN PATENT DOCUMENTS

EP 0 533 813 B1 10/1991

OTHER PUBLICATIONS

U.S. Appl. No. 14/867,052, filed Sep. 28, 2015.
U.S. Appl. No. 15/073,805, filed Mar. 18, 2016.

* cited by examiner

*Primary Examiner* — Chuck O Kendall
(74) *Attorney, Agent, or Firm* — Scully, Scott, Murphy & Presser, P.C.; Margaret McNamara, Esq.

(57) ABSTRACT

A system, method and computer program product to refine an original complex CFG into a simpler CFG showing interesting paths and reducing interfering paths with dynamic input for the state of program. The method receives/encodes dynamic user input in the form of annotations which encodes user's special interests or knowledge of the program at run time, e.g., some assumptions of any variables appeared, which can be equations of variable and value or relationships between variables. The method then simplifies all the branching points in a generated AST (Abstract Syntax Tree) whenever possible by querying a SMT (Satisfiability Modulo Theories) solver with branching condition and the user annotations and by evaluating immediate values of expressions or eliminate unreachable parts in the CFG. Finally, the method generates a simplified CFG by simplified AST. This can assist a programmer to understand the code and facilitates correlating different basic blocks under a same scenario.

11 Claims, 8 Drawing Sheets

```
void partition(int *a, int l, int h)
{
    int i = l, j = h+1;
    while (true)
    {
707 ——— while( a[++i] < a[l] )
708 ——— if (i==h) break;
710 ——— while( a[l] < a[--j] )
        if (j==l) break;
        if (i>=j) break;
        exch(a,i,j);
    }
    exch(a,l,j);
    return j;
}
```

```
void partition(int *a, int l, int h)
{
    int i = l, j = h+1;
    ++i;
    while( true ) {  ——— 711
        --j;
        if (j==l) break;
    }
    exch(a,l,j);
    return j;
}
```

USING DYNAMIC INFORMATION TO REFINE CONTROL FLOW GRAPHS

FIELD

The present disclosure relates generally to control flow graphs for representing information, and more particularly, to a system, method and computer program product for refining an original complex CFG into a more user-friendly CFG.

BACKGROUND

A control flow graph (CFG) is a representation, using graph notation, of all paths that might be traversed through a program during its execution. In a control flow graph each node in the graph represents a basic block, which is a portion of the code within a program with only one entry point and only one exit point. CFG is very good tools that are widely used in software engineering. They help programmers understand the design of the big project. However in practical, some problems are faced. The generated CFG may be hard to use.

For example, FIG. 2 depicts an example CFG 200, which is very hard to read and understand. While the control flow graph such as shown in FIG. 2 is intended to help programmers understand the design of a big project, however, in practical, some problems are faced because the generated CFG is very complicated and hard to read by human in example scenarios such as: to understand code logic of a large scale product with long history; or to understand the relationship between the changing code and the existing code; or when attempting to isolate a root cause in thousands of paths when some error occurred.

SUMMARY

In one aspect, this disclosure provides a system, methods and computer program product for refining an original complex CFG into a more user-friendly CFG showing "interesting" paths and reducing interfering paths with dynamic input for the state of program.

The system, method and computer program product provides an ability to refine a complete CFG based on user's particular dynamic input for the state of the program, so as to highlight the interesting paths and reduce interfering paths.

According to one aspect, there is provided a computer-implemented method for refining a graphical depiction of a computer program for analysis. The method comprises: obtaining, from a computer program compiler, an abstracted depiction of a program source code to be refined; receiving, at a hardware processor, annotations for the abstracted depiction of the program source code, the annotations directed to simplifying one or more paths of the program source code for analysis; determining, using the hardware processor, a presence of branching points at the one or more paths of the program source code; for each branch condition of a branching point, using the programmed hardware processor to query a satisfiability modulo theory (SMT) solver tool with the branching condition and the user specified annotations; and based on a satisfiability determination for the branch condition and specified annotations at the SMT solver, simplifying the abstract depiction of the program source code.

According to a further aspect, there is provided a computer program product for refining a graphical depiction of a computer program for analysis, the computer program product comprising a computer-readable storage medium having computer-readable instructions stored therein. The computer readable program instructions are read and carried out by a hardware processor to perform a method to: obtain, from a computer program compiler, an abstracted depiction of a program source code to be refined; receive, at the hardware processor, annotations for the abstracted depiction of the program source code, the annotations directed to simplifying one or more paths of the program source code for analysis; determine, using the hardware processor, a presence of branching points at the one or more paths of the program source code; for each branch condition of a branching point, use the hardware processor to query a satisfiability modulo theory (SMT) solver tool with the branching condition and the user specified annotations; based on a satisfiability determination for the branch condition and specified annotations at the SMT solver, simplify the abstract depiction of the program source code.

According to a further aspect, there is provided a computer system for refining a graphical depiction of a computer program for analysis. The system comprises: a processor; a memory coupled to the processor, wherein the memory comprises instructions which, when executed by the processor, cause the processor to: obtain, from a computer program compiler, an abstracted depiction of a program source code to be refined; receive, at the processor, annotations for the abstracted depiction of the program source code, the annotations directed to simplifying one or more paths of the program source code for analysis; determine, using the processor, a presence of branching points at the one or more paths of the program source code; for each branch condition of a branching point, use the hardware processor to query a satisfiability modulo theory (SMT) solver tool with the branching condition and the user specified annotations; based on a satisfiability determination for the branch condition and specified annotations at the SMT solver, simplify the abstract depiction of the program source code.

BRIEF DESCRIPTION OF THE DRAWINGS

Aspects of the present disclosure will be understood and appreciated more fully from the following detailed description taken in conjunction with the appended drawings in which:

FIG. 7 shows an example high-level code segment of a partition( ) function which may be input to the system for CFG refinement in an example implementation;

FIG. 8 depicts an example result of applying a first user example annotation and invoking the methods of FIGS. 5 and 6 to simplify the corresponding code shown in FIG. 7;

DETAILED DESCRIPTION

Embodiments of the present disclosure may include a system, a method, and/or a computer program product. The computer program product may include a computer readable storage medium (or media) having computer readable program instructions thereon for causing a processor to carry out aspects of the invention.

Figure 1:
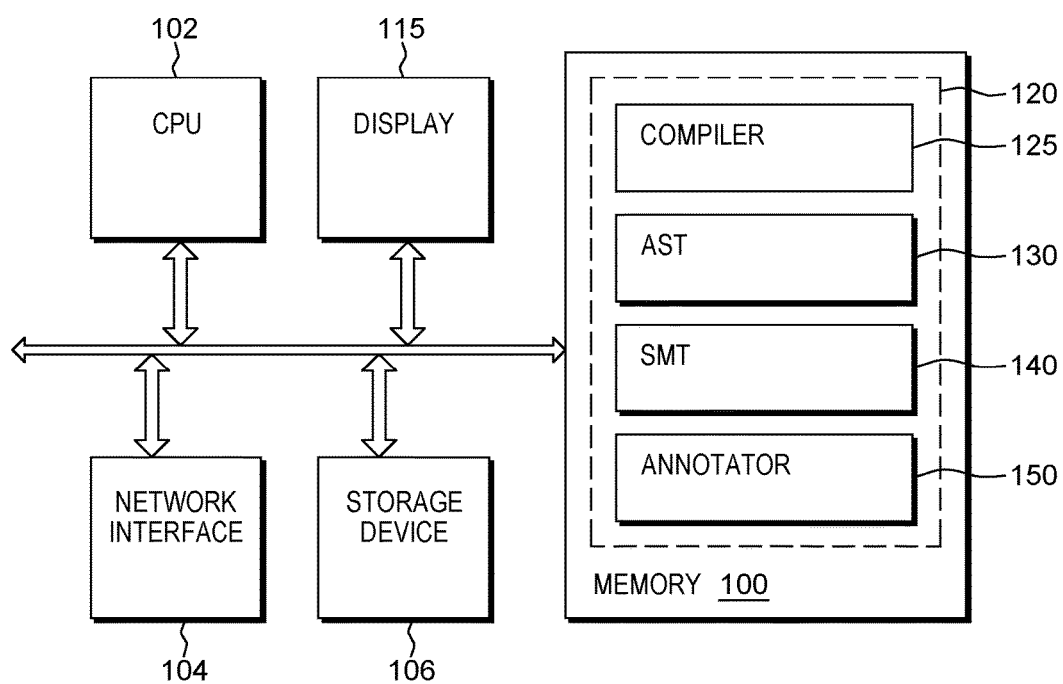
FIG. 1 is a tool 100 embodied as computer system implementing methods that provide a user with an ability to refine a complex control flow graph (CFG) based on user's particular dynamic input for the state of the program in one embodiment.

As shown in FIG. 1, the system, method and computer program product is embodied as a tool 100 providing an interface that provides a user with an ability to refine a complex control flow graph CFG based on user's particular dynamic input for the state of the program, so as to highlight the interesting paths and reduce interfering paths.

As shown in FIG. 1, the tool 100 runs on a computer device that includes a processor device embodied as CPU 102, a network interface 104, a storage device 106 such as a magnetic or optical disk storage or a direct access storage device (DASD), and a memory 110, such as RAM. Logic is embedded in the RAM 110 and is embodied as computer executable code that may be loaded from a remote source (e.g., over a network via the network interface), local permanent optical disks (e.g., compact disk read-only memory (CD-ROM)), magnetic storage (such as a disk), or a direct access storage device (DASD) into memory 110 for execution by CPU 102. Generally, the memory 110 includes computer readable instructions, data structures, program modules and application interfaces as embodied as logic 120 in the form of a compiler 125, an Abstract Syntax Tree (AST) generator 130, Satisfiability Modulo Theories (SMT) solver program components 140, and an annotation tool 150. In other embodiments, the compiler, AST and SMT components may reside and run on separate computer systems. For example, the tool 100 may be configured to communicate (send/receive) a compiled or un-compiled user program to another system via the corresponding network interface.

The complier program 125, in particular, receives source code _ such as a user's computer program, e.g., written in a high-level language such as C, C++, Java, etc., and implements known compiler methods to generate a computer executable user program. In one embodiment, the corresponding computer executable program is used by the AST 130, SMT 140 and annotator 150 components of the tool 100 for refining an original complex program code or CFG.

Figure 2:
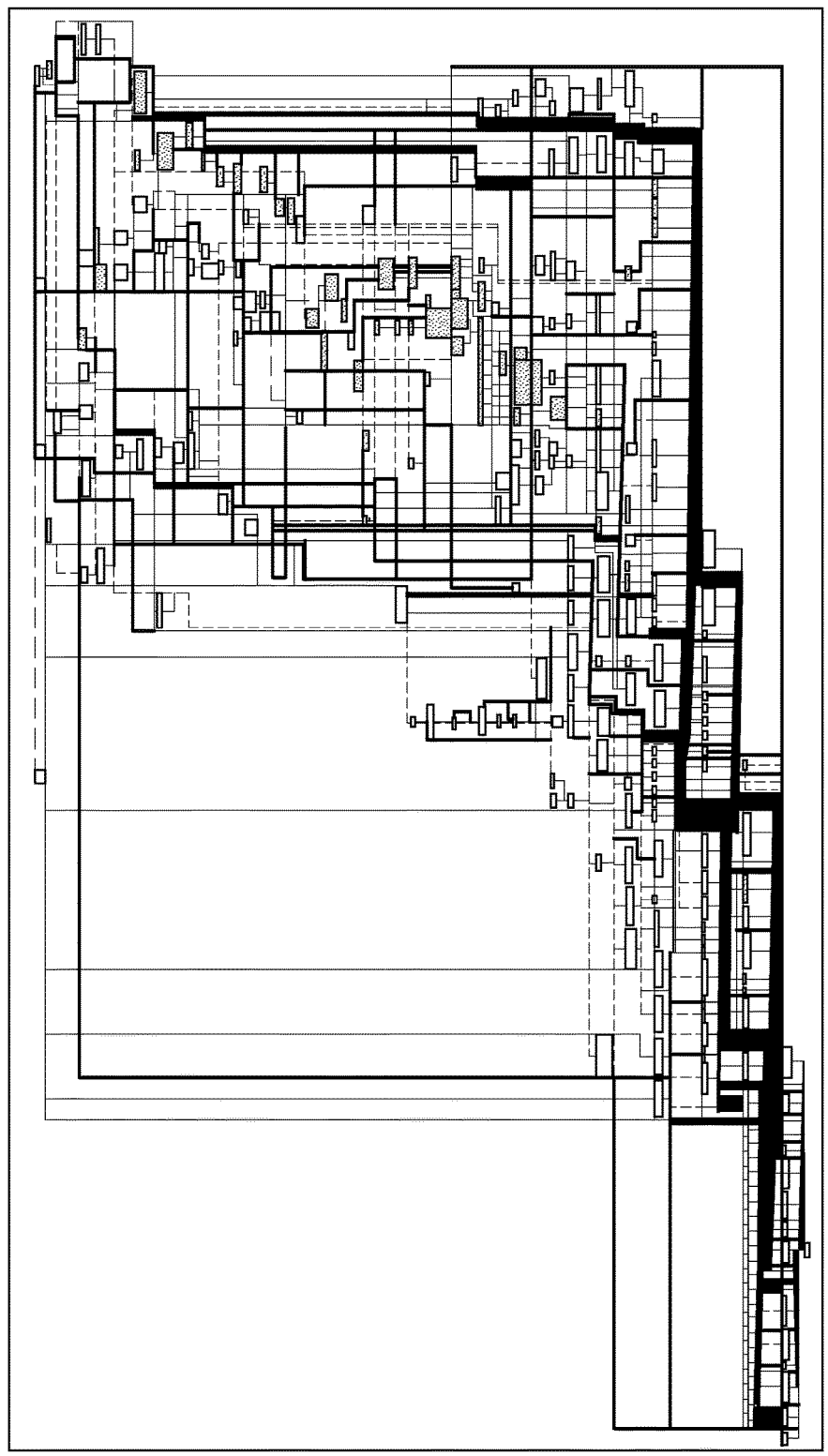
FIG. 2 depicts an example control flow graph that while intended to help programmers understand the design of a big project, is very complicated and hard to read by humans.
Figure 3:
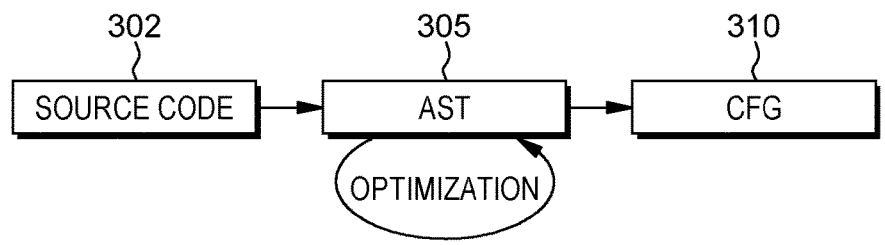
FIG. 3 shows an exemplary method of the compiler component 300 in one aspect of the invention.

FIG. 3 shows an exemplary method 300 of the compiler component in one aspect of the invention. In the method depicted in FIG. 3, the compiler receives the source code 302 and as part of the source code compiling process, invokes the AST component 130 to generate an Abstract Syntax Tree version 305 of the user's program. That is, the AST of the user's program may be generated by the compiler 125 during a compilation step and generate a visual output (not shown). In one embodiment, the compiler component utilizes a graph structure to deduce certain properties of the program and accordingly optimizes the program. At 310, the system may dump the AST as a picture file, which picture file is referred to as the CFG. The CFG may be configured to also provide the user (e.g., programmer) with a graphical description of the program, as an additional view to understand the program. However, as shown in an example depiction of CFG 200 in FIG. 2, the raw CFG 200 may be too verbose and/or complex. The programmer may only want to focus on a certain specific moment in the run of the program.

Figure 4:
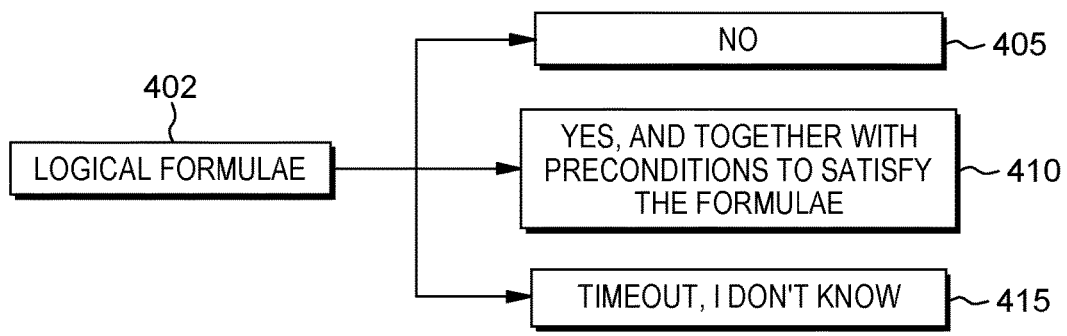
FIG. 4 depicts use of a Satisfiability Modulo Theories (SMT) solver component of the tool 100 for deciding the satisfiability (or dually, a validity) of propositionally complex formulas.

Referring now to FIG. 4, the Satisfiability Modulo Theories (SMT) solver component 400 of the tool 100 is fed a binary or user source code corresponding to the original user program and preferably comprises a solver tool for deciding the satisfiability (or dually, a validity) of propositionally complex formulas in theories such as arithmetic and uninterpreted functions with equality. In one embodiment, the SMT (Satisfiability Modulo Theories) is a collection of theories that are capable to logically reason about a program. In one embodiment, the SMT solver component 140 can be a standalone software product, e.g., Microsoft z3, which uses mature technique SMT theory, to evaluate a constant expression or statement in the compiler related area.

As shown in FIG. 4, in one example implementation, the SMT solver component 140 receives an input of a list of logical formulae 402, e.g., equation(s), inequation(s), total function(s), predicate(s), etc. Then, responsive to the SMT solver processing, the component outputs a NO response 405 if the input is unsatisfiable, or outputs a YES response and conditions to meet 410 if the input is satisfiable. Otherwise, the system may not generate an answer or will timeout at 415.

The tool 100 of FIG. 1 implements systems, methods and computer program products for refining an original complex CFG into a more user-friendly CFG can assist a programmer to understand the code more quickly and correlate different basic blocks under a same scenario more easily.

In the methods run at tool 100, a complete CFG is refined based on a user's particular dynamic input for the state of the program, so as to highlight interesting paths and reduce interfering paths. To encode the particular input, a user may specify, e.g., input some assumptions of any variables appeared, which can be equations of variable and value or relationships between variables. These information can be the dynamic information of the program from the real running cases. The method will then evaluate immediate values of expressions or eliminate unreachable parts in the CFG.

The methods can receive as input real world data as input, and re-factor the CFG to assist user of the huge program to browse and analyze. It provides a way to remove all irrelevant details with respect to a programmer's focus, especially it can consider information at runtime.

Referring back to FIG. 1, in a first aspect, the method analyzes and refines a program CFG with user's input for the program state at runtime. In one embodiment, the system provides the annotating tool 150 providing a mechanism via display device 115 for a programmer to annotate the program with dynamic input for the program state. In one embodiment, annotations encode a programmer's "wild guess" or knowledge of the program at run time. The annotations can be applied to any variable in the source code and can be in the form of equations or inequations, using customized total functions or predicates. As a response, the AST component is simplified by feeding the SMT tool with the program and annotation of the program's dynamic state. Then, the tool presents the simplified AST as a CFG for user visualization and use.

Figure 5:
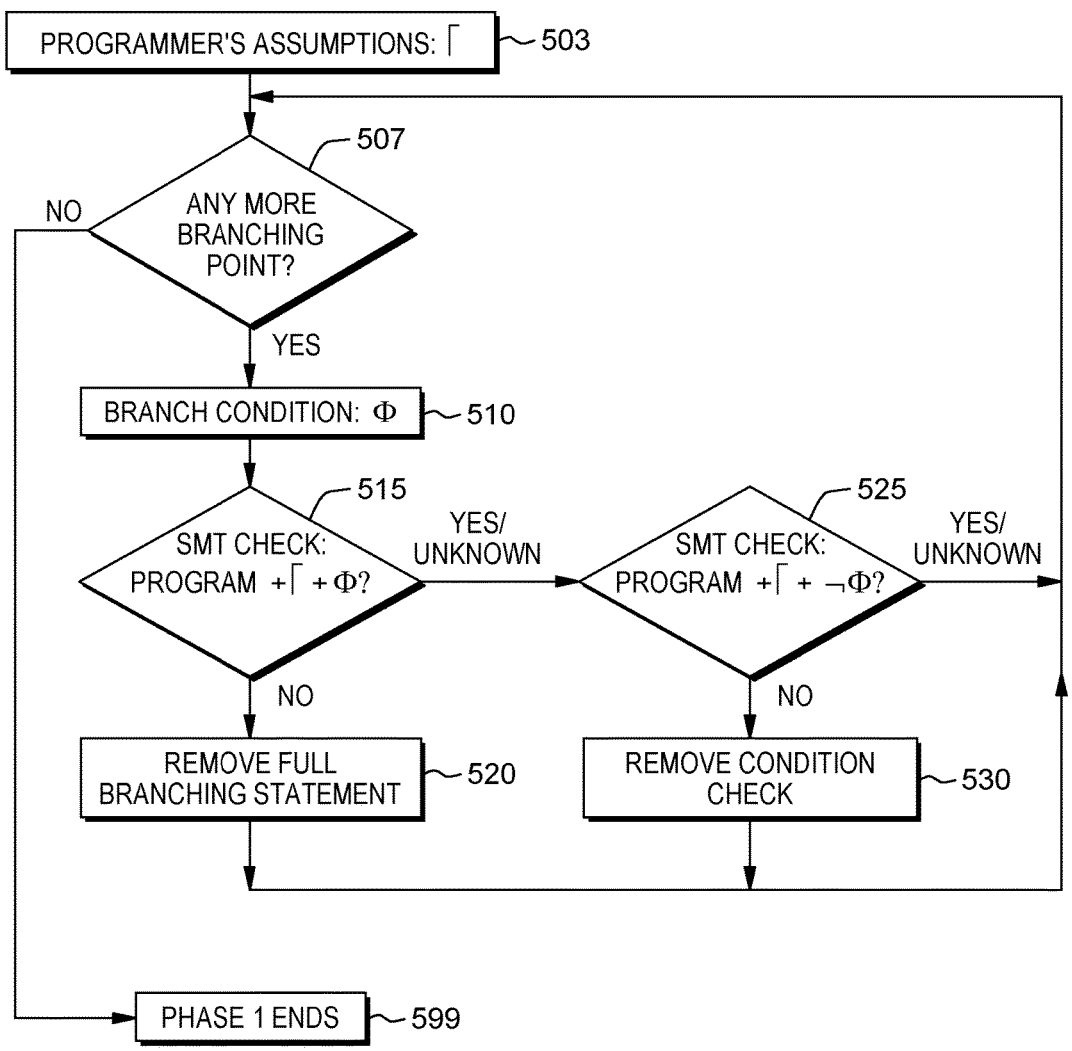
FIG. 5 depicts a first method phase of a process performed at tool 100 for simplifying the AST in one embodiment.

FIG. 5 depicts a first method phase 500 of the process performed at tool 100 for simplifying the AST. The method steps 500 in phase 1 processing implements the SMT determining and will simplify the code path by removing identified condition check and branching statement. Initially, via the annotation tool/interface, the programmer has entered initial assumptions about any variable in the source code that can be in the form of equations or inequations, using customized total functions or predicates. As referred to in FIG. 5, a programmer's assumption is indicated as "Γ". In FIG. 5, after the programmer gives initial assumptions at 503, the method traverses through all branching points in the program's AST, which branching points found in the program usually involve: if statement, while statement, for statement, etc. As referred to herein, a condition (e.g., a boolean logical formula) in such a statement is "Φ". At 507, a decision is made as to whether there are any more branching points to consider. If there are no branching points to consider, the first phase of the method terminates at 599. If there are branching points to consider, then the method proceeds to 510 to ascertain the current branch condition Φ. For this current branch condition Φ, the method proceeds to 515 to perform a SMT check of the program given the annotations, i.e., programmer's assumptions Γ and condition Φ. If the SMT tool generates an output that is negative, i.e., the propositionally complex formula is not satisfiable, then the Boolean logical formula does not permit the branching to happen at all, and the whole statement can be removed. Thus, the method proceeds to 520 at which time the system removes the full branching statement from the code. The method then returns back to 507 to ascertain whether there are any more branching points given the AST.

In a preferred embodiment, the method includes querying the SMT tool twice as the two queries leads to a simplification. For the first query at 515, the SMT evaluates a piece of the code with all programmer's assumptions Γ, together with Φ. If as a result of the first query, the SMT tool generates a yes or unknown evaluation, then the process proceeds to 525 to perform a second query. For the second query, at 525, the SMT evaluates with all programmer's assumptions Γ, together with a ¬Φ (negative Φ). If at 525 the SMT solver generates a no, then it means the branching definitely will happen and therefore the condition check can be removed at 530, after which, the method returns to step 507 to ascertain if any more branching points are to be processed.

Otherwise, at 525, all other cases mean that the branching is likely to happen and the condition check is necessary, and no simplification to this particular point can be applied before returning to step 507.

Figure 6:
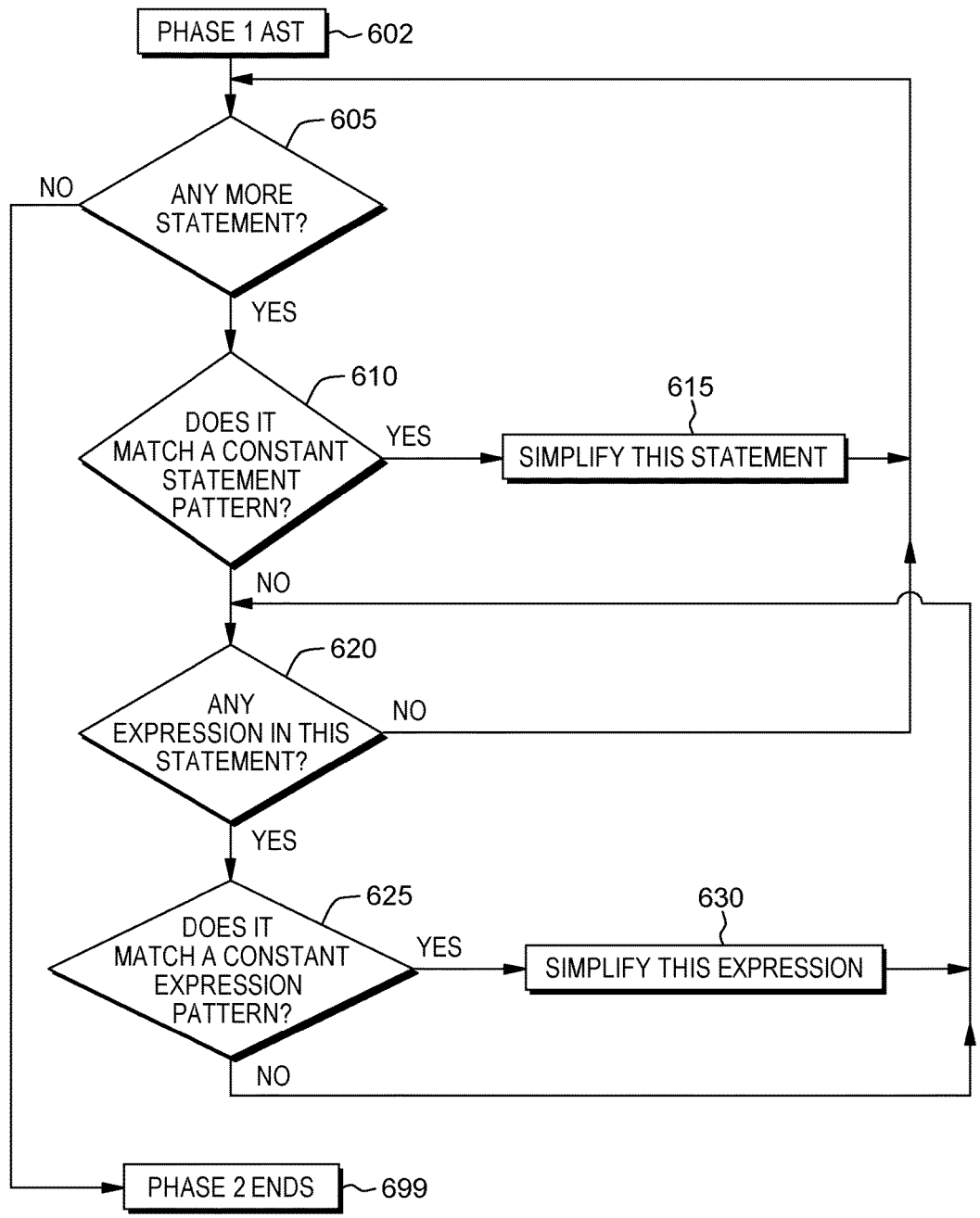
FIG. 6 depicts a second phase of the process performed at tool 100 for simplifying the AST in one embodiment.

FIG. 6 depicts a second phase 600 of the process performed at tool 100 for simplifying the AST. The method steps 600 in phase 2 performs processing constant evaluation to further simplify the code path by applying constant values generated in phase 1 processing. Initially, after phase 1, at 602, it is the case that some constant expression/statement emerges. In phase 2 constant evaluation processing, the code reduced by phase 1 processing is traversed to identify a statement, which can be a single piece of executable code (e.g., if (i==h) break; exch(a,i,j); return j), and/or expression, which can be a value, variable or function that can be evaluate (e.g., 5, a, i ==h) Thus, the system determines whether they can be eliminated or replaced by immediate values. Thus, a method of the second phase depicted in FIG. 6 performs a evaluation of constant expression/statements which are usually very easy to detect, e.g., a constant statement "while (true) {break;}". There are very mature compiler techniques to evaluate a constant expression or statement.

As shown in FIG. 6, the second phase 600 begins at 605 where a determination is made as to whether there are any more statements to be evaluated. If there are no more statements to evaluate at 605, then the second phase of the method terminates at 699. Otherwise, if there is a statement for evaluation, a check or determination is made at 610 as to whether the statement matches a constant statement pattern that can be simplified, e.g., a statement that contains constant values (e.g., While(true) {break} is a constant statement, where "true" is a constant). If it is determined at 610 that the detected statement does match a constant statement pattern, then this statement can be simplified at 615, and the process returns to 605 to evaluate any further statements. However, if at 610, it is detected that the statement does not match a constant statement pattern, then the process proceeds to 620 to determine if there is any expression in the current statement. If it is determined at 620 that there is no expression in the current statement, then the method returns to 605 to determine whether there are any further statements to evaluate. Otherwise, if there is determined at 620 presence of an expression in the current statement, then the method proceeds to 625 to check or determine whether the expression matches a constant expression pattern that can be simplified, e.g., an expression that contains constant values (e.g., "5+3" where 5 and 3 are constants). If it is determined that the expression does match a constant expression pattern, then this expression can be simplified at 630 and the process returns to 620 to determine whether there is any further expressions in the current statement that can be evaluated.

However, if at 625, it is detected that the expression does not match a constant expression pattern, then the process proceeds to 620 to again evaluate whether there is any further expression in the current statement. If no further expressions are found, then the return to 605 will evaluate whether there is any more statements having expressions until no statements are evaluated.

FIG. 7 shows an example high-level code segment 700, e.g., written in C++, of a partition( ) function 705, for example. In an example implementation, a user/programmer may input program code including the function 705 and dynamically input the following annotations of program dynamic state, that can be the real case at some failure point, or can be some important code path that user has more of an interest in. Alternately, the annotations may be some wild guess just used for testing the code.

For the example code segment 705 of FIG. 7, there are shown values l, h, and an array a[ ], which can have any value that is unknown when the source code is being analyzed. However, according to one aspect, a user can dynamically input the annotations. For the example code of FIG. 7, the example four annotations that would also be input to the system may include:
1. l<h and a[l] is the smallest elements of all.
2. l<h and a[l] is the largest elements of all.
3. l==h
4. l+1=h These four examples shows different situations at the time entering the partition( ) function 705. With one assumption, the program's logic become much simpler than it originally is. Annotations (or alternatively "dynamic input") may include a guess or assumption(s) for the run time information) are potential state when programs runs (dynamic analysis) as a user may never know in the static analysis time. With those annotations applied, some code paths will be unreachable, and are removed, and the whole CFG can be simplified. Thus, in the static analysis time, a user can also take above dynamic information into consideration, so as to generate more meaningful CFG output.

Once the code and annotations are input, the first phase and second phase method simplifications commence. For example, applying the first annotation (annotation 1), and invoking the methods of FIGS. 5 and 6, the example function partition( ) 705 can be simplified to the corresponding code segment 715 shown in FIG. 8. In this example, with original code segment 705 (FIG. 4) being input and including specified annotation 1 (1<h and a[l] is the smallest elements of all), in phase 1, the SMT check will simplify the code path. That is, for the first While loop 707 of the code segment 705:
while(a[++i]<a[l])
if (i==h) break;

it is found that the condition check (a[++i]<a[l]) is always false, its associate code block (if (i==h) break;) can never be reached, so the code is simplified by removing this check and its associate code block, i.e. removing full branching statement 708. Further, for the second While loop 710 of code segment 705:
while(a[l]<a[--j])
if (j==l) break;

it is found that the condition check (a[l]<a[--j]) is always true, its associate code block (if (j==l) break;) can always be executed, so the check can be removed with a true statement 711 and the code updated as shown in FIG. 8, i.e. only removing a condition check:
while(true) {
--j;
if (j==l) break;
}

Figure 9:
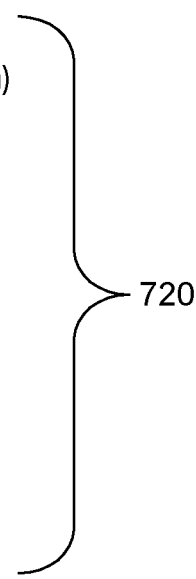
FIG. 9 depicts an example result of applying a third example user annotation and invoking the methods of FIGS. 5 and 6 to simplify the corresponding code shown in FIG. 7.

As a further example, applying the third annotation (annotation 3), and invoking the methods of FIGS. 5 and 6, the example function partition( ) can be simplified to the corresponding code segment 720 shown in FIG. 9. With this $3^{rd}$ annotation applied, the transformed code shown in FIG. 9 reveals that it is easy to spot a potential bug that there is a wired while loop which could be infinitely long. So this partition( ) function should never be used in the trivial case l==h. The methods of FIGS. 5 and 6 will help in improving the quality of source code.

In the example depicted in FIGS. 7-9, because there will be some annotation(s) input, some constant will be generated after phase 1 processing. The phase 2 simplification is configured to just apply the constant value directly and generate more friendly code and the CFG.

The Table 1 below shows an example simplification process that may be applied at phase 2 processing after phase 1 is complete:

| before phase 1 | after phase 1 | after phase 2 |
| --- | --- | --- |
| a + b | 5 + 3 | 8 |
| while(x == 2&&y < 3&&z == 5) | while(true&&y < 3&&true) | while(y < 3) |

Users can thus provide their own annotations as they like, and the simplified program will be generated by the methods described herein.

In a further embodiment, the simplification method described above in the examples are applied to the generated AST of the original program. After invoking the methods of Phase 1 and 2, there is generated for output a reduced AST.

As known to skilled artisans, the transformed AST file is dumped as a CFG using known convention techniques. The system, methods and computer program products thus enable refining an original complex CFG into a more user-friendly CFG can assist a programmer to understand the code more quickly and correlate different basic blocks under a same scenario more easily.

Figure 10:
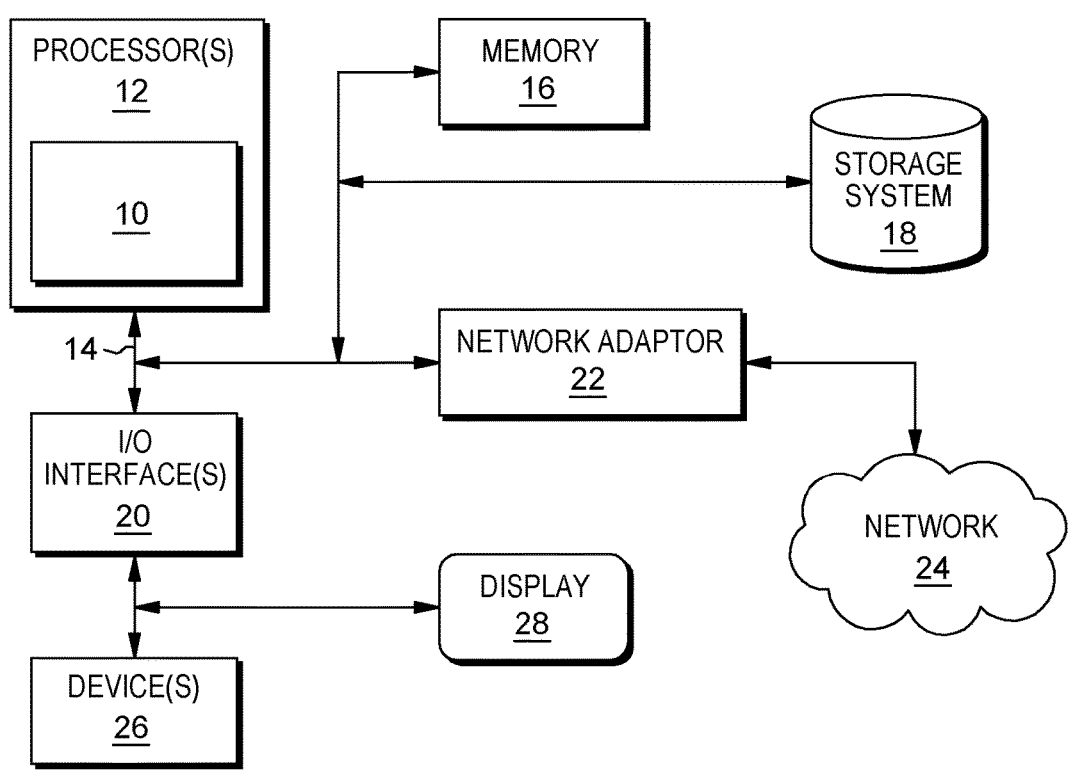
FIG. 10 is a simplified block diagram illustration of an exemplary hardware implementation of a computing system, constructed and operative in accordance with the embodiments described herein.

FIG. 10 is an embodiment of a computer or processing system in accordance with the present invention.

The computer or processing system shown is configured to implement the methods herein: to 1) help programmers and maintainer understand the big project quickly and save the cost by learning one interesting path at one time; 2) facilitate the software product maintenance and the software reverse engineering, especially the legacy and big software; and 3) help fault scene recreation by trimming off irrelevant paths and highlighting relevant factors. The methods further provide a way to remove all irrelevant details with respect to a programmer's focus, especially it can consider information at runtime.

The computer system illustrated is one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for refining a graphical depiction of a computer program for analysis, said method comprising:
   obtaining, from a computer program compiler, an abstracted depiction of a program source code to be refined;
   receiving, at a hardware processor, annotations for the abstracted depiction of the program source code, the annotations directed to simplifying one or more paths of the program source code for analysis;
   determining, using the hardware processor, a presence of branching points at said one or more paths of the program source code;
   for each branch condition of a branching point, using the programmed hardware processor to query a satisfiability modulo theory (SMT) solver tool with said branching condition and said user specified annotations; and
   responsive to a negative satisfiability determination for said branch condition and specified annotations at said SMT solver, simplifying said abstract depiction of said program source code by removing a full branching statement associated with said branching point; and
   responsive to a positive satisfiability determination for said branch condition and specified annotations at said SMT solver, said method further comprising:
   obtaining a negative branch condition; and
   responsive to a negative satisfiability determination for said negative branch condition and specified annotations at said SMT solver, simplifying said abstract depiction of said program source code by removing a condition check; and
   transforming, using the hardware processor, said simplified abstract depiction of said program source code into a program control flow graph (CFG), said CFG being dynamically refined with said annotations input for the program state at a runtime.

2. The method of claim 1, wherein said simplifying said abstract depiction of said source code further comprises:
   detecting a constant expression or a statement in said source code; and
   one of: eliminating said detected constant expression or statement and replacing said detected constant expression or statement by immediate values, or replacing said detected constant expression or statement by immediate values.

3. The method of claim 2, further comprising:
   in response to detecting said statement, determining whether said statement matches a constant statement pattern; and if said detected statement matches said constant statement pattern, then simplifying the statement.

4. The method of claim 3, wherein if said detected statement does not match said constant statement pattern, then:
   determining whether the statement includes an expression; and in response to determining that the statement includes an expression:
   determining whether said expression matches a constant expression pattern; and if said detected expression matches said constant expression pattern, then simplifying the expression.

5. A computer program product for refining a graphical depiction of a computer program for analysis, the computer program product comprising a non-transitory computer-readable storage medium having computer-readable instructions stored therein, the computer readable program instructions read and carried out by a hardware processor to perform a method to:
   obtain, from a computer program compiler, an abstracted depiction of a program source code to be refined;
   receiving, at the hardware processor, annotations for the abstracted depiction of the program source code, the annotations directed to simplifying one or more paths of the program source code for analysis;
   determine, using the hardware processor, a presence of branching points at said one or more paths of the program source code;

for each branch condition of a branching point, use the hardware processor to query a satisfiability modulo theory (SMT) solver tool with said branching condition and said user specified annotations; and responsive to a negative satisfiability determination for said branch condition and specified annotations at said SMT solver, simplify said abstract depiction of said program source code by removing a full branching statement associated with said branching point; and responsive to a positive satisfiability determination for said branch condition and specified annotations at said SMT solver, said hardware processor carrying out further program instructions to perform:

obtaining a negative branch condition; and responsive to a negative satisfiability determination for said negative branch condition and specified annotations at said SMT solver, simplifying said abstract depiction of said program source code by removing a condition check; and transform said simplified abstract depiction of said program source code into a program control flow graph (CFG), said CFG being dynamically refined with said annotations input for the program state at a runtime.

6. The computer program product of claim 5, wherein to simplify said abstract depiction of said source code, said computer readable program instructions further configure the hardware processor to:

detect a constant expression or a statement in said source code; and one of: eliminate said detected constant expression or statement and replace said detected constant expression or statement by immediate values, or replace said detected constant expression or statement by immediate values.

7. The computer program product of claim 6, wherein said computer readable program instructions further configure the hardware processor to:

in response to detecting said statement, determine whether said statement matches a constant statement pattern; and if said detected statement matches said constant statement pattern, then simplifying the statement.

8. The method computer program product of claim 7, wherein if said detected statement does not match said constant statement pattern, then said computer readable program instructions further configure the hardware processor to:

determine whether the statement includes an expression; and in response to determining that the statement includes an expression:

determine whether said expression matches a constant expression pattern; and if said detected expression matches said constant expression pattern, then simplifying the expression.

9. A computer system for refining a graphical depiction of a computer program for analysis, the system comprising:

a processor;

a memory coupled to the processor, wherein the memory comprises instructions which, when executed by the processor, cause the processor to:

obtain, from a computer program compiler, an abstracted depiction of a program source code to be refined;

receive, at the processor, annotations for the abstracted depiction of the program source code, the annotations directed to simplifying one or more paths of the program source code for analysis;

determine, using the hardware processor, a presence of branching points at said one or more paths of the program source code;

for each branch condition of a branching point, use the hardware processor to query a satisfiability modulo theory (SMT) solver tool with said branching condition and said user specified annotations; and responsive to a negative satisfiability determination for said branch condition and specified annotations at said SMT solver, simplify said abstract depiction of said program source code by removing a full branching statement associated with said branching point; and responsive to a positive satisfiability determination for said branch condition and specified annotations at said SMT solver, said instructions further configure said processor to:

obtain a negative branch condition; and responsive to a negative satisfiability determination for said negative branch condition and specified annotations at said SMT solver, simplify said abstract depiction of said program source code by removing a condition check; and transform said simplified abstract depiction of said program source code into a program control flow graph (CFG), said CFG being dynamically refined with said annotations input for the program state at a runtime.

10. The system of claim 9, wherein to simplify said abstract depiction of said source code, said instructions further configuring said processor to:

detect a constant expression or a statement in said source code; and one of: eliminate said detected constant expression or statement and replace said detected constant expression or statement by immediate values, or replace said detected constant expression or statement by immediate values.

11. The system of claim 10, wherein said instructions further configure said processor to:

in response to detecting said statement, determine whether said statement matches a constant statement pattern; and if said detected statement matches said constant statement pattern, then simplifying the statement; and if said detected statement does not match said constant statement pattern, then said instructions further configure said processor to:

determine whether the statement includes an expression; and in response to determining that the statement includes an expression:

determine whether said expression matches a constant expression pattern; and if said detected expression matches said constant expression pattern, then simplifying the expression.

* * * * *